United States Patent [19]

Murphy

[11] 4,038,631
[45] July 26, 1977

[54] METHOD FOR GENERATING AND DETECTING SEISMIC SHEAR WAVE ENERGY IN THE EARTH

[76] Inventor: Vincent J. Murphy, 89 Traincroft, Medford, Mass. 02155

[21] Appl. No.: 629,810

[22] Filed: Nov. 7, 1975

[51] Int. Cl.² .............................................. G01V 1/00
[52] U.S. Cl. ........................... 340/15.5 BH; 181/104;
181/106; 181/112; 181/119; 340/15.5 SW;;
175/1; 175/50
[58] Field of Search ............... 340/15.5 SW, 15.5 BH,
340/15.5 CP; 181/104, 102, 105, 106, 119, 114,
401, 402; 175/1, 41, 45, 50

[56] References Cited

U.S. PATENT DOCUMENTS

| | | | |
|---|---|---|---|
| 3,053,338 | 9/1962 | Blizard | 181/402 |
| 3,475,722 | 10/1969 | White | 340/15.5 SW |
| 3,614,891 | 10/1971 | Nolte | 181/104 |
| 3,653,460 | 4/1972 | Chelminski | 181/120 |
| 3,808,822 | 5/1974 | Chelminski | 181/119 |

*Primary Examiner*—Howard A. Birmiel
*Attorney, Agent, or Firm*—Parmelee, Johnson & Bollinger

[57] ABSTRACT

A method for generating and detecting seismic shear wave energy in the earth are disclosed useful for determining shear wave velocities in localized regions in the earth at sites where foundations of large civil engineering structures are proposed or earth embankments and dams have been built, thereby providing information affecting the basic dynamic design parameters for constructing or evaluating the project and obtaining earthquake resistant design. An airgun of elongated generally cylindrical configuration and having a single discharge port opening out radially on one side only for abruptly releasing compressed air in a direction perpendicular to the axis of the airgun is lowered into a borehole in a manner and by apparatus to control the direction in azimuth at which this single lateral discharge port is aimed. The airgun is fired at predetermined vertical intervals in the borehole for generating seismic shear wave energy, the resultant waves being sensed by geophones located at the same depth in other boreholes. Azimuthal aiming of the discharge port optimizes the generation of P waves or S waves relative to the geophone detecting stations. Aiming of the discharge port "in line" is more suitable for P wave determination and aiming transversely is more suitable for S wave determinations. Where earth layers or strata of special interest are encountered, the airgun is fired at more closely spaced vertical intervals, and if this layer is inclined, the geophones are raised or lowered in their boreholes to be positioned within the same layer.

7 Claims, 6 Drawing Figures

METHOD FOR GENERATING AND DETECTING SEISMIC SHEAR WAVE ENERGY IN THE EARTH

DESCRIPTION

The present invention relates to method and apparatus for generating and detecting seismic shear wave energy in the earth useful for providing information about regions of the earth where foundations of large civil engineering structures are to be located or earth embankments and dams have been built. Such information aids in envolving the basic dynamic design parameters to be incorporated into the proposed project or in evaluating the existing project for obtaining earthquake resistant design, for example for power plants, pumped storage facilities, stadiums, buildings, dams, bridges, etc.

BACKGROUND OF THE INVENTION

The recent emphasis on in-situ measurements of the seismic shear wave velocity values has resulted in an increased interest in techniques for field measurements and also in seismic energy sources for such use. The reader may refer to the article by Mooney in the American Society of Civil Engineers, Geotechnical Division, Journal, 1974. Although explosives have long been used for such in-situ velocity measurements they are dangerous to handle, expensive to use, and are prohibited in many areas. Moreover, explosives tend to release their energy in all directions and can destroy or alter the borehole. If a new borehole is drilled, it is in a different location so the orginal measurement cannot be reproduced. Interest has turned to non-explosive seismic energy sources and a number of such sources have been discussed by Stoke, Woods and Richard in the ASCE, Geotechnical Division, Journal, 1973.

The reader is also referred to the following technical papers by the inventor:

Paper by C. Martin Duke, "Techniques for Field Measurements of Shear Wave Velocity in Soils," Vol. III, Pages 39-54, Proceedings of the 4th World Conference on Earthquake Engineering, Santiago, Chile, 1969. Comments by Vincent J. Murphy, Pages 123-124, Vol. IV of 4th World Conference on Earthquake Engineering.

Research Brief — by Vincent J. Murphy — Wave Propagation, Page 63 of Soil Dynamics Specialty Conference Volume, 7th International Conference of Soil Mechanics and Foundation Engineering, Mexico City, 1969.

"Geophysical Engineering Investigation Techniques for Microzonation," Proceedings of the International Microzonation Conference, Pages 131-159, Vol. 1, Seattle, Washington, 1972, by V. J. Murphy.

"Caracas Earthquake of July 1967 — Geophysical Field Measurements," Proceedings of the 5th World Conference on Earthquake Engineering, Rome, Italy, 1974, by D. Linehan (S. J.) and V. J. Murphy.

Paper presented (orally) by V. J. Murphy at 44 Annual Meeting of the Society of Exploration Geophysicists, Dallas, Texas, Nov. 12, 1974, "Seismic Investigations for Nuclear and Pumped Storage Power Plants."

SUMMARY OF THE INVENTION

The present invention provides a method for generating and detecting seismic shear wave energy in the earth useful for determining shear wave velocities of the earth layers and geologic structures at sites where foundations of large civil engineering structures are proposed or where earth embankments and dams have been built. This information is used for evolving the basic dynamic design parameters for the construction to obtain earthquake resistant characteristics. A specially constructed airgun of elongated generally cylindrical configuration has a single discharge port which opens out radially on one side only of the airgun for abruptly releasing compressed air as a powerful blast aimed in a direction perpendicular to the axis of the airgun. This single-ported airgun is lowered into a borehole which may be cased or uncased by apparatus which enables the operator to control the direction in azimuth at which this single lateral discharge port is aimed. The airgun is fired at predetermined vertically spaced levels within the borehole for generating seismic shear wave energy at these different levels in the earth. The resultant waves are sensed by geophones located at the same depth in other boreholes located nearby and arranged in desired patterns relative to the airgun.

By virtue of the fact that the borehole is not destroyed, measurements can be repeated with exact duplication. Moreover, the relative positions of the airgun and geophones can be reversed by interchanging their locations in the respective boreholes for making measurements with respect to the shear (S) waves and pressure (P) waves travelling in opposite directions.

The discharge port is aimed in azimuths for optimizing the generation of P waves or S waves relative to the geophone detecting stations. Aiming of the discharge port "in line" with respect to the location of the geophone detecting stations is more suitable for P wave determinations while aiming transversely is more suitable for S wave determinations. Whenever earth layers or strata of special interest are encountered, the airgun can be raised or lowered by small increments in its borehole for providing more closely spaced P wave and S wave determinations. If a particular layer or stratum is inclined, the geophones may be raised or lowered in their respective boreholes to be positioned within this same layer.

In order to control the azimuth orientation of the airgun within the borehole, a torsionally stiff rod, preferably of tubular configuration is connected to the top of the airgun and is provided with an index line or mark for indicating the angular position of the lowered gun. The discharge port can be turned to various predetermined azimuths relative to the geophone detecting station, for example, such as 90°, 180°, 270° and 360°. This torsionally stiff rod may be in the form of a flexible metal or plastic hose unrolled from a reel located at the mouth of the borehole or may be in sections which are fastened together as the airgun is progressively lowered.

Advantageously, the sudden release of compressed air through a single port of an airgun aimed perpendicularly to the axis of the elongated cylindrical airgun and hence aimed perpendicularly to the axis of the borehole itself is very effective in generating the P and S waves and enables the intensity of either kind of seismic wave to be augmented relative to the other as received at the geophone detecting station for enhancing the measurement sensitivity.

The various features, aspects, objects and advantages of the method of the present invention will become more fully understood from a consideration of the accompanying drawings in conjunction with the following detailed description.

BRIEF DESCRIPTION OF THE DRAWINGS

FIG. 4 is an elevational sectional view, on a scale which is intermediate that of FIGS. 1 and 2, showing further apparatus for controlling the azimuth at which the single discharge port of the airgun is aimed;

DETAILED DESCRIPTION OF PREFERRED EMBODIMENT

Figure 1:
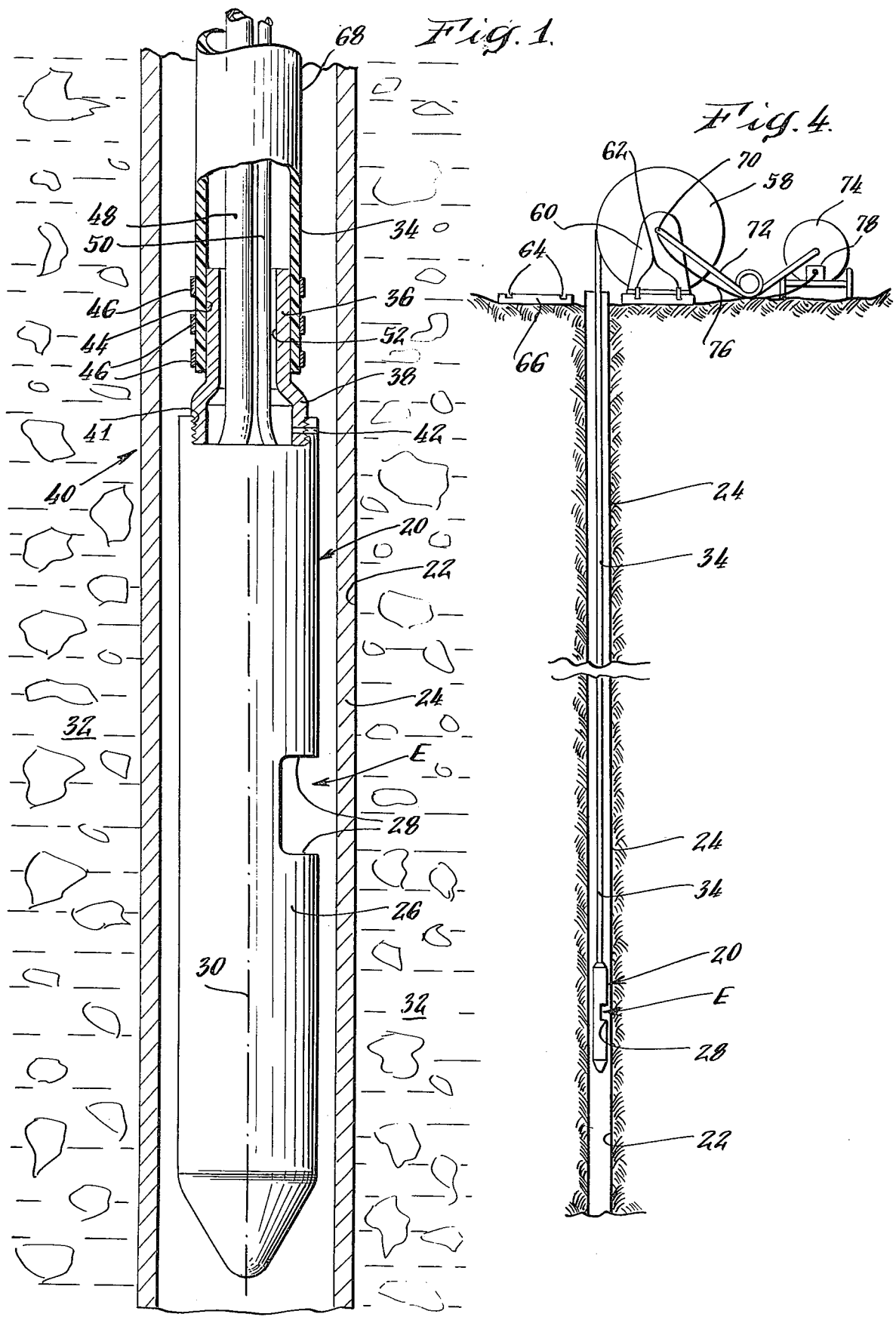
FIG. 1 is an elevational sectional view of a cased borehole in the earth with a single port airgun lowered into the borehole by a torsionally stiff tubular member for controlling the azimuth at which this discharge port is aimed.

Referring to the drawings in greater detail, an airgun 20 (FIG. 1) is shown having an elongated cylindrical configuration suitable for lowering into a small diameter borehole 22, for example such as one lined with a steel casing 24 with a 3 inch inside diameter. This airgun 20 is similar to a PAR (trademark) airgun, Model DHS 5500, available commercially from Bolt Associates, Inc. of Norwalk, Connecticut, except that it is especially constructed to have an elongated narrow cylindrical housing 26 with only a single discharge port 28 opening out radially on one side only of the airgun for releasing compressed air as a powerful blast aimed in a direction perpendicular to the longitudinal axis 30 of the airgun. Also, this airgun 20 is especially constructed to provide means for attaching a torsionally stiff azimuth control member to the upper end of the airgun, such special attachment means 40 (which includes elements 36, 38, 41, 42, 44, 46) being of a diameter no larger than the airgun housing 26, as will be explained in detail further below.

It is preferred that the borehole 22 be cased as shown in FIG. 1 (and also those in which the geophones are to be positioned) because a better coupling of the seismic energy into the surrounding earth 32 is obtained with a cased borehole as well as better coupling of the geophones to the earth. Thus, the presence of a casing 24 enables measurements to be more precisely made as well as enabling the airgun and geophone to be moved and handled more readily in their respective boreholes. However, the present invention can also be employed with advantageous results using uncased boreholes. It is more economical in some cases to save the costs of the casing 24 and its installation even though this absence makes the handling of the airgun and of the geophones more difficult due to irregularities and dislodgeable material along the wall of uncased holes. In spite of such possible economies, it is preferred to use boreholes for the most definitive results.

In order to control the azimuth at which the port 28 is aimed, an elongated torsionally stiff control member 34 is used. As shown in FIG. 1, this azimuth control member 34 is a flexible tubular pipe of an outside diameter (O.D.) at least two thirds the O.D. of the airgun housing 26. The attachment means 40 which is of an O.D. no larger than the airgun housing 26 includes a coupling 36 for attaching the lower end of the control member 34 to the airgun. This coupling 36 is a rigid metal part having an enlarged lower end 38 which is adapted to be screwed into a threaded socket 41 formed in the upper end of the airgun 20. This socket 41 is shown as being provided by specially extending the wall of the housing 26 upwardly a short distance and internally threading this wall. After the threaded end 38 is tightly screwed into the socket 41, a locking pin 42 may be inserted through a drilled hole in the wall of the socket entering the threaded end 38 to prevent the unscrewing thereof.

The main body of the coupling 36 is slightly smaller in O.D. than its threaded end 38 to be adapted for insertion into the tubular control member 34, and it has a plurality of circumferential grooves 44 for tightly gripping the inner surface of this tubular member. A plurality of hose clamps 46 encircle the tubular member 34 for tightly securing it in place over the grooves 44.

Compressed air is supplied into the airgun 20 through a high pressure hose line 48, for example at a pressure in the range from 1,000 pounds per square inch (P.s.i.) up to 2,500 p.s.i. and peferably in the upper half of this range for providing a very energetic seismic wave energy source when this compressed air is released through the port 28. The firing of the airgun 20 is controlled by an electrical cable 50 which serves to feed a signal pulse to a solenoid-controlled valve (not shown) in the housing 26 when it is desired to fire the airgun. Such a solenoid-controlled valve is shown in U.S. Pat. No. 3,588,039 of S. V. Chelminski and A. J. Delano. In order to accommodate the high pressure air line 48 and electric firing line 50, there is an axial bore 52 extending through the coupling 36, and these line 48 and 50 extend up through this bore 52 and then up through the interior of the tubular member 34.

When a blast of high pressure air is suddenly released through the port 28, it transmits a significant amount of seismic energy into the surroundng earth 32 thereby generating both pressure or compressional waves (P waves) and shear or S waves. This region immediately in front of the port 28 is labelled E to indicate that there is the immediate source of the seismic energy being generated.

Figure 2:
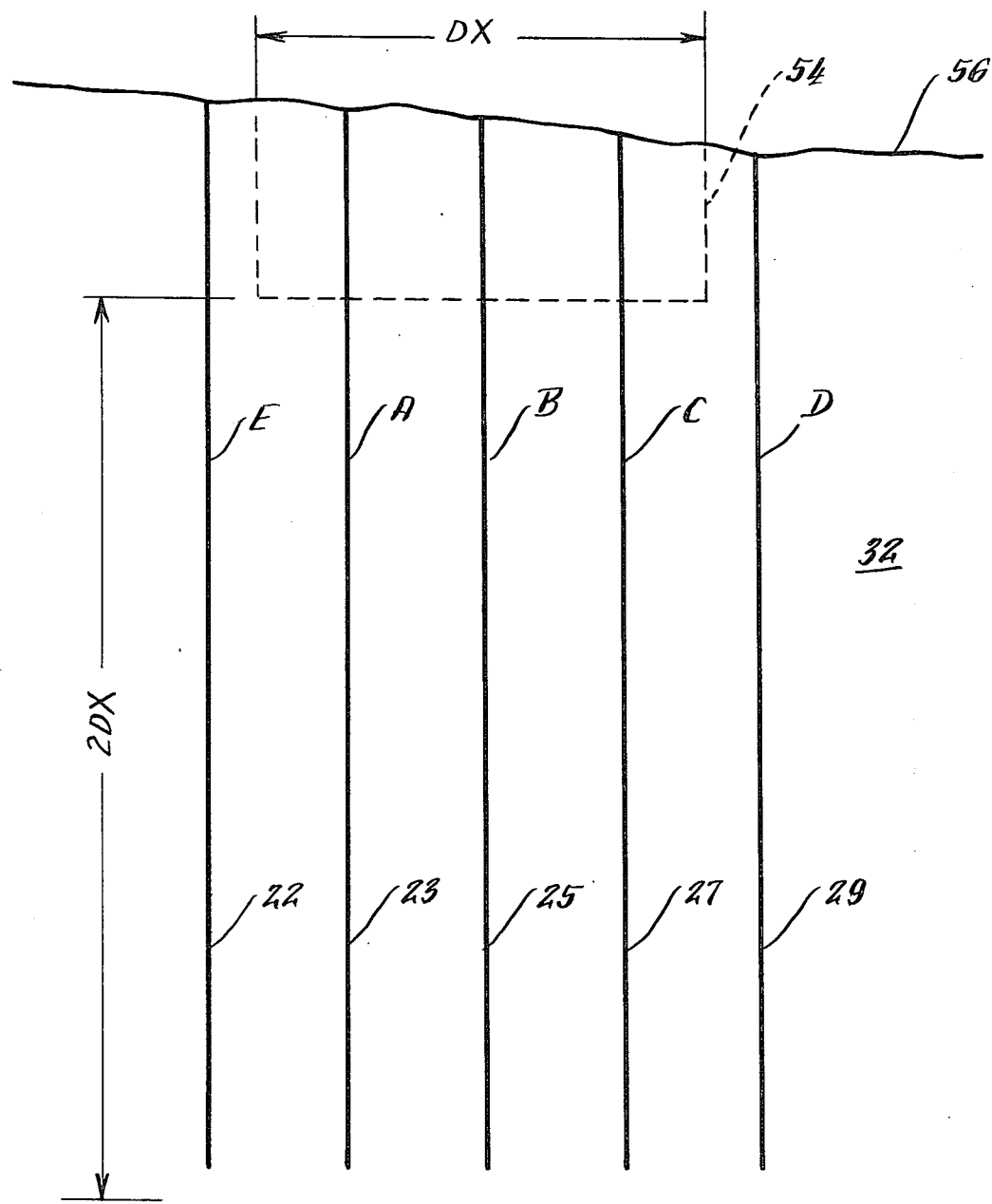
FIG. 2 is an elevational sectional view, on a smaller scale than FIG. 1, of a proposed construction site for a large civil engineering project showing a plurality of boreholes for in-situ measurements of seismic shear wave and pressure wave velocities, including the energy source and geophone stations.

To explain the advantageous employment of the method of the present invention for making an in-situ measurement of seismic S and P wave velocity, attention is invited to FIG. 2. It is proposed to dig down in the region shown by the dotted outline 54 for constructing the foundation for a large civil engineering project, such as one of those mentioned in the introduction. This foundation 54 will have an overall horizontal length which is indicated by the dimension DX.

Figure 3:
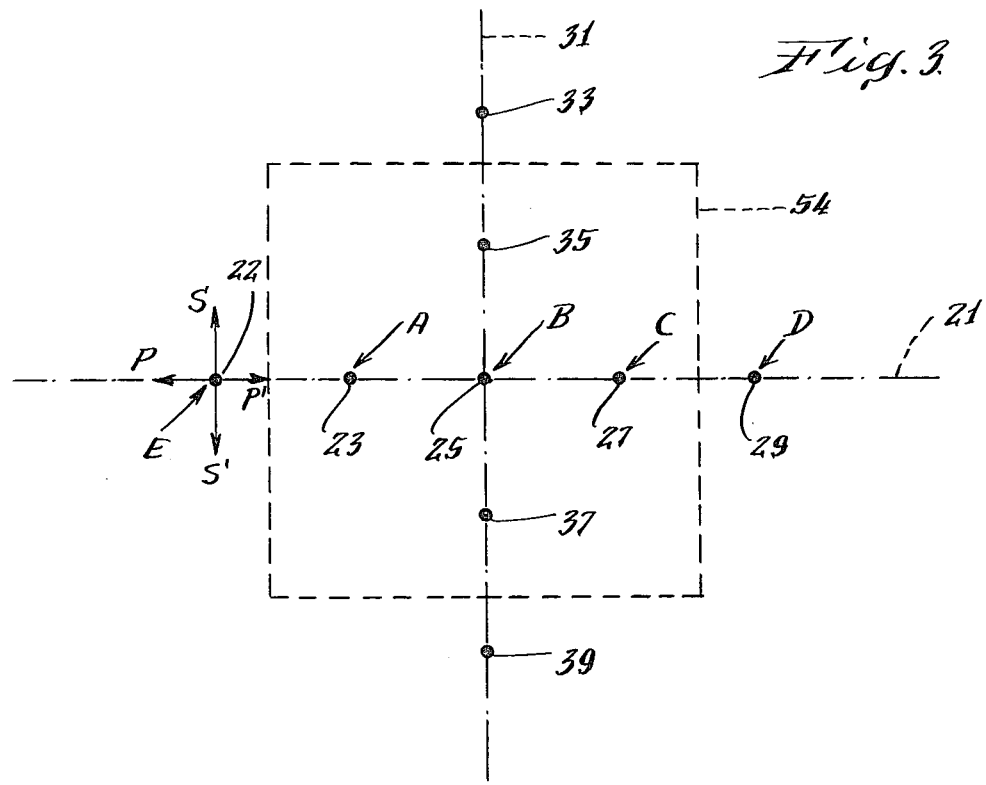
FIG. 3 is a plan view of the region shown in FIG. 2.

A plurality of boreholes 22, 23, 25, 27 and 29 are drilled down from the earth's surface 56 to a depth below the lowest point on the bottom of the proposed foundation 54, which depth is at least equal to the foundation's overall greatest length DX. In FIG. 2, the boreholes 22, 23, 25, 27 and 29 are shown extending down to a level approximately 2DX below the lowest point of the proposed foundation. These boreholes are spaced across the site. They are arranged along a straight line 21, as seen in FIG. 3, passing through the center of the foundation site 54. Additional boreholes 33, 35, 37 and 39 are drilled along another straight line 31 at right angles to the first and also passing through the center of the foundation site. The outermost boreholes 22, 29, 33 and 39 are shown located somewhat outside of the perimeter of the foundation site.

The airgun seismic energy source 20 is lowered down its borehole 22, as shown in FIG. 4, by unrolling the tubular control member 34, such as from a reel 58 mounted on a carriage 60, or from a coil (not shown) laid out on the ground. This carriage has a plurality of roller wheels 62 running in circular tracks 64 located on an annular platform 66 positioned concentric about the mouth of the borehole 22. There is an index line 68 (FIG. 1) extending longitudinally along the control member 34. This index line 68 is aligned with the ports 28, and thus the position of this index line 68 as observed at the mouth of the borehole indicates the azimuth at which this port 28 is aimed.

In order to change the azimuth of the airgun port 28, the carriage 60 is rolled around the circular tracks into a different orientation. The reel 58 has a rotating gland connection 70 at its axis of rotation. This gland connection 70 communicates between the end of the high pressure line 48 (see FIG. 1) and a flexible hose 72, so that the compressed air can be fed through this flexible hose 72 into line 48 from a suitable compressed air source 74, such as a high pressure tank of compressed air or a small multi-stage air compressor.

The reel 58 also has a slip ring electrical connection concentric about the reel axis for completing the electrical firing circuit from the firing line 50 (see FIG. 1) through the slip ring connection and through an electrical cable 76 to a firing control circuit 78.

As an alternative to using a continuous tubular control member 34, this control member may comprise a series of lengths (or sections) of rigid pipe of metal or plastic. These lengths of pipe are screwed together in sequence by the field party as the airgun 20 is progressively lowered down the borehole. The air line 48 and electrical control line 50 are inserted through each length of pipe before it is coupled to the next lower pipe section. In order to maintain the azimuthal orientation of each pipe section with respect to the others and with respect to the airgun port 28, an index line is scribed longitudinally along the outside of the pipe sections. The straight-line continuity of this index line is maintained by using set screws to lock the screw connections between successive pipe sections and to prevent inadvertent misalignment.

The airgun may be fired at any predetermined vertical intervals, for example such as every 10 feet, and the geophone units are usually lowered in their boreholes to the same level as the energy source E (FIG. 2). Also, as shown in FIG. 2, there are four geophone units A, B, C and D which are lowered by the same predetermined increments as the source E into the preferably cased boreholes 23, 25, 27 and 29, so that they usually all are maintained approximately at the same level as the source of energy source E. Each of the geophone units A, B, C and D is a three-component unit, i.e., it comprises three separate detectors positioned on mutually orthogonal axes. One such detector in each geophone unit is positioned to have its maximum sensitivity in the vertical direction, and the other two are positioned to have their sensitivities in two horizontal directions at right angles to each other. Such three-component geophone detector units A, B, C and D are well known in the art and, therefore, they are not described in further detail herein.

Each of the three detectors in each geophone unit A, B, C, and D has a separate sensing circuit extending thereto, thus making a total of twelve circuits for this sequence of geophone units A, B, C, and D. Each of these sensing circuits is connected to its own individual amplification and recording means, such that twelve separate channels of recording are obtained. Such twelve-channel recording instruments are well known in the art and, therefore, are not described in detail.

In order to measure the S wave velocities, the port 28 is aimed as shown by the arrow S (FIG. 3) at an azimuth of 90° relative to the line 21 of geophone stations, and the airgun is fired. After the resulting seismic waves have been sensed at the respective geophone stations and recorded, the azimuthal control apparatus such as shown in FIG. 4 is turned. The port of the airgun is aimed at the next desired azimuth, for example at an azimuth of 180° (i.e. "in line" ) relative to the line 21 of the geophone stations A, B, C and D. This 180° orientation is indicated by the arrow P (FIG. 3) which is directed along the line 21 but away from the geophone stations. Then the airgun is again fired.

After the resulting seismic waves have been recorded, the airgun is turned to the next desired azimuth which may be 270° (perpendicular) as shown by the arrow S' (FIG. 3) or may be 360° (in line) as shown by the arrow P' and is fired. In most cases, the shear waves generated by orientation of the discharge port at an azimuth of either 90° (arrow S), or 270° (arrow S' ) produce similar results at the geophone stations. Thus, perpendicular orientation arrow S or S' may be used.

The pressure P waves generated when the airgun port is oriented in line, at 180° (arrow P) or 360° (arrow P' ) will produce reversed polarity results at the geophone stations; both of the line orientations 180° and 360° are usually used.

The P wave, which is a pressure or compressional wave, has a higher speed of transmission than the shear wave. For example, in some rock formations, the P wave velocity is approximately 12,000 feet per second; whereas, in saturated wet sandy soils the P wave velocity is approximately 5,000 feet per second. In such rock, the S wave velocity is approximately 6,000 feet per second, and in such saturated sandy soil, it is approximately 800 to 1,200 feet per second.

If a layer or stratum in the earth 32 of special interest is encountered, the airgun may be moved down by smaller vertical increments, for example every 2.5 feet and the geophone units are similarly moved down. When an inclined layer or stratum is being investigated, the respective geophone units A, B, C and D are raised or lowered so as to position them in the same layer as that in which the energy source E is located.

The airgun source E may be switched in position with any one of the geophones A, B, C or D, or positioned in other boreholes for making all of the same measurements in reverse or different directions. By virtue of the fact that the airgun housing 26 will fit within a 3-inch I.D. borehole, it will fit in the same borehole as a geophone unit and thus may conveniently be swapped in position with any geophone.

Similar procedures are used along the line 31 of boreholes 33, 35, 25, 37 and 39. If desired, additional boreholes may be drilled, and also different arrays of the four geophone units may be used. An "in line" array is shown in FIG. 3.

Another useful array is an L-shaped layout. For example, the geophone units C and D are placed in boreholes 35 and 33, respectively, or in boreholes 37 and 39, respectively, thus providing an L-shaped array.

A further useful array is an X-shaped layout. For example, the energy source E is located in the central borehole 25 and the four geophone units are positioned in four equally spaced boreholes, such as those at 23, 35, 27 and 37, or in the four boreholes 22, 33, 29 and 39.

In some cases, the predetermined pattern of the geophone holes must be changed because of peculiar situations encountered at a site, such as a hugh boulder or other obstacle which precludes drilling of planned boreholes.

In the "in line," L-shaped or X-shaped arrays discussed previously, the spacings between boreholes may be uniform or non-uniform. Other possible configurations of borehole arrays can also be used.

Regardless of the pattern of geophones employed, the single ported airgun enables the optimum S wave generation to be obtained relative to any geophone station by orienting the port 28 perpendicular to a line drawn from the airgun to that particular geophone station. Conversely, the optimum P wave generation for the geophone station is obtained by orienting the single port in line with that station, i.e. either aimed at 180° or 360° relative to a line drawn from the airgun to that geophone station.

Figure 5:
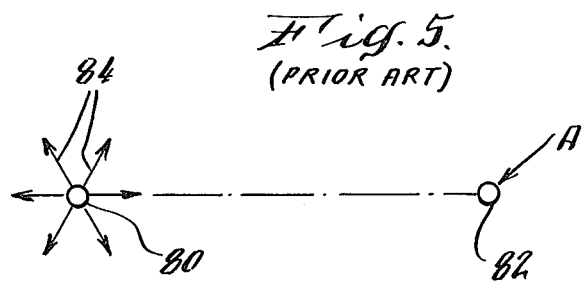
FIG. 5 is a plan sectional view for purposes of explanation taken through two boreholes one of which contains an explosive charge being detonated and the other of which contains a geophone unit.

As shown in FIG. 5, when an explosive charge is detonated in a borehole 80, relative to a geophone unit A in another borehole 82, the energy is released in all directions, as shown by the arrows 84. Compressional waves (P waves) are generated radiating in all directions from the borehole 80, but a relatively smaller amount of shear wave energy is transmitted as compared with employment of the present invention.

Figure 6:
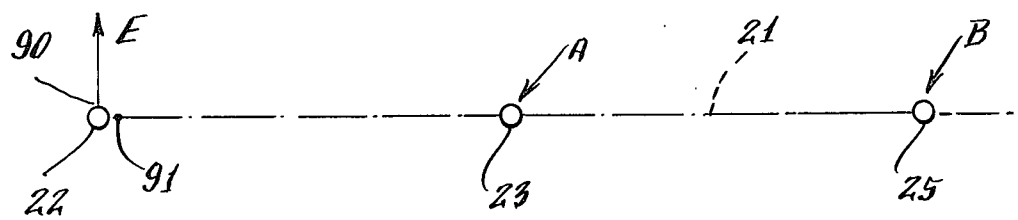
FIG. 6 is a similar plan sectional view for purposes of explanation of why the single ported airgun is more effective than the explosive of equal energy content in generating shear waves.

Advantageously, as shown in FIG. 6, when the single-ported airgun 20 is fired in its borehole 22, the aimed blast of the suddenly released air momentarily imparts its energy E primarily in one direction perpendicular to the line 21 extending from the borehole to the geophone stations. Thus, the earth at the point 90 near the borehole 22 is moved in the direction of E while the earth at point 91 near the borehole 22 on the line 21 tends to remain where it was. Consequently, relative to each other, the point 90 is moving in the direction E, thereby generating strong shear waves in the earth travelling in the direction along the line 21 as desired for making shear wave velocity measurements in the localized region extending from borehole 22 to borehole 23, and also in the localized regions extending along the line 21 to any other geophone stations as shown in FIG. 3.

I claim:

1. The method for generating seismic waves in localized regions of the earth useful for shear wave moduli determinations for use in evaluating the basic dynamic engineering design parameters of large civil engineering structures comprising the steps of:
providing at least two boreholes in the earth,
providing a narrow elongated airgun capable of being lowered into one of the boreholes and having a single discharge port on one side only opening out in a direction perpendicular to the logitudinal axis of the airgun,
positioning said airgun in one of the boreholes and supplying high pressure compressed air thereto,
positioning a geophone unit in another one of the boreholes,
aiming said port in a first direction in azimuth relative to the location of the geophone unit,
suddenly discharging a blast of high pressure compressed air through said port while so aimed,
aiming said port in another direction in azimuth relative to the geophone location, and
again suddenly discharging a blast of high pressure compressed air through said port while said port is aimed in said latter direction.

2. The method for generating seismic wave energy in the earth for making shear wave moduli investigation in localized regions of the earth comprising the steps of:
providing at least two boreholes in the earth,
providing a narrow elongated airgun capable of being lowered into one of the boreholes and having a single discharge port opening out on one side only of the airgun perpendicular to its longitudinal axis,
positioning a geophone in at least one of the boreholes,
positioning said airgun in another one of the boreholes and from the surface aiming said discharge port in azimuth perpendicular to a line extending from the airgun to the geophone for optimizing the generation of seismic shear waves in the earth relative to the geophone location,
feeding high pressure compressed air to the airgun,
suddenly discharging compressed air through said port while aimed in said azimuth,
from the surface aiming said discharge port in azimuth in line with said line for optimizing the generation of seismic compressional waves in the earth relative to the geophone location, and
suddenly discharging compressed air through said port while aimed in said latter azimuth.

3. The method of making determinations of seismic shear wave velocities in the earth at sites where large civil engineering structures are proposed to be built comprising the steps of:
providing at least two boreholes in the earth,
providing an airgun capable of being lowered into one of said boreholes and having only one discharge port directed radially outwardly from one side of the airgun,
lowering said airgun into said one borehole,
aiming the airgun therein to a sequence of predetermined azimuths relative to the other borehole,
firing the airgun while it is being aimed at each of the azimuths in the predetermined sequence, and
sensing the resulting seismic waves appearing in the earth at said other borehole.

4. The method of making determinations of seismic shear wave velocities in the earth at sites where large civil engineering structures are proposed to be built comprising the steps of:
providing a plurality of boreholes in the earth arranged at spaced intervals along a straight line as seen in plan view,
providing an airgun capable of being lowered into one of said boreholes and having only one discharge port directed radially outwardly from one side of the airgun,
lowering said airgun into said one of said boreholes in said line,
aiming the airgun port therein to a sequence of pedetermined azimuths relative to said line of boreholes, firing the airgun while it is being aimed at each of the azimuths in the predetermined sequence, and sensing the resulting seismic waves appearing in the earth at the other boreholes in said line.

5. The method of making determinations of seismic shear wave velocities as claimed in claim 4, including the steps of:

lowering said airgun to predetermined vertically spaced levels within said one borehole, at each of said levels aiming the airgun port to a sequence of predetermined azimuths relative to said line of boreholes, and sensing the resulting seismic waves appearing in the earth at the same sequence of levels in said other boreholes in said line.

6. The method of making determinations of seismic shear wave velocities in the earth as claimed in claim 4, including the steps of:

lowering said airgun to predetermined vertically spaced levels separated by relatively small vertical increments within said one borehole, when a stratum of special interest in the earth is encountered, at each of said levels aiming the airgun port to a sequence of predetermined azimuths relative to said line of boreholes, and sensing the resulting seismic waves appearing in the earth in said stratum at said other boreholes in said line at a sequence of vertically spaced levels separated by relatively small vertical increments.

7. The method of making determinations of seismic shear wave velocities as claimed in claim 5, including the steps of:

providing a second plurality of boreholes in the earth arranged at spaced intervals along a second straight line extendng perpendicular to said first straight line to form an "L" pattern of boreholes as seen in plan view, and sensing the resulting seismic waves appearing in the earth at the same sequence of levels in said second plurality of boreholes.

* * * * *